United States Patent

Ambler et al.

[15] 3,668,471
[45] June 6, 1972

[54] DEVICE FOR DETECTION AND CONTROL OF LEAKAGE AND EXCESSIVE CURRENT FLOW

[72] Inventors: Edward Curtis Ambler, Newington; Walter R. Bush, West Simsbury; Andrew E. Scoville, Ellington, all of Conn.

[73] Assignee: The Stanley Works, New Britain, Conn.

[22] Filed: Dec. 28, 1970

[21] Appl. No.: 101,748

[52] U.S. Cl. ..........................317/18 D, 317/27 R, 317/33 SC
[51] Int. Cl. ..............................................................H02h 3/28
[58] Field of Search ................................317/33 SC, 18 D, 27

[56] References Cited

UNITED STATES PATENTS

| | | | |
|---|---|---|---|
| 3,408,558 | 10/1968 | Peterson et al. | 317/33 SC |
| 3,324,352 | 6/1967 | Hover | 317/33 SC |
| 3,566,189 | 2/1971 | Wilson et al. | 317/18 D |
| 3,525,903 | 8/1970 | Morris et al. | 317/18 D |

Primary Examiner—James D. Trammell
Attorney—Peter L. Costas

[57] ABSTRACT

A protective circuit device for connection between an associated electrical power supply and an associated electrical load which detects excessive current drawn by the load. Solid state devices in the protective device are rendered conductive or nonconductive in response to a signal produced by a current transformer. The amplified signal is applied to the gate of a silicon controlled rectifier which shorts power going to a unijunction transistor oscillator. The shorting action terminates a pulse trigger supply to the solid state devices to render them nonconductive.

In one embodiment, the protection device also detects electrical leakage from the load by means of a differential transformer which produces an error signal when there is current imbalance between conductors from the line supply. The amplified differential transformer secondary voltage is applied to the gate of the silicon controlled rectifier to cause the solid state devices to become nonconductive.

14 Claims, 2 Drawing Figures

Inventors
E. Curtis Ambler
Walter R. Bush
Andrew E. Scoville
By Peter L. Costas
Attorney Inventors
E. Curtis Ambler
Walter R. Bush
Andrew E. Scoville
By Peter L. Costas
Attorney

3,668,471

DEVICE FOR DETECTION AND CONTROL OF LEAKAGE AND EXCESSIVE CURRENT FLOW

BACKGROUND OF THE INVENTION

Increasing use of electrical power for many diverse applications along with increasing concern about hazards associated with such use has produced requirements for detection and control of excess current flow and leakage from electrically powered devices. Conventional circuit breakers provide an "overload" portion adapted to provide circuit interruption when there is a continuous current flow at a moderate level above the nominal rating of the circuit breaker and, in addition, a "short circuit" trip portion designated instantaneously to interrupt a circuit if it detects a current flow considerably above the nominal rating. Generally such devices are mechanical in nature with moving parts which are relatively slow moving and have a reliability factor less than that provided by presently available static switching devices. Moreover, such protective devices that do have "overload" and "short circuit" protection generally do not include protection against line-to-ground leakage paths when the current flowing is less than the nominal rating of the device.

Considerable difficulty has also been experienced with devices providing only one of these forms of protection because there is a continuing danger of electrocution as well as fire since any one of these types of circuit malfunction constitutes a hazard and may exist without one of the other types.

The utilization of circuit protective devices having both forms of protection adjacent the load is desirable to provide circuit protection while minimizing interruption of power to other devices, and such placement is particularly important where the device includes ground fault protection in order to provide a system which avoids nuisance tripping problems. When ground fault devices are used at a panel board or switchboard to limit ground fault current, the cumulative leakage of the various electrical devices connected to that branch circuit often results in a ground fault trip although no one of the devices has leakage sufficient to be hazardous. If the set point of the ground fault protection device is raised to a sufficient level to allow current flow and avoid nuisance tripping, the leakage from a particular device may be hazardous to personnel or likely to cause fire or explosion although the higher branch circuit ground fault limit has not yet been reached. Utilization of devices having the several features adjacent individual loads as opposed to placement in branch circuits carrying a plurality of devices has been deterred in large part because of the relatively high initial and operating costs for devices heretofore known and/or because of the size involved for the mechanical elements heretofore employed most generally in such devices.

It is an object of the present invention to provide a novel electrical protective circuit device which is capable of responding reliably to current flow in excess of a desired level and which may be manufactured and operated at low cost to facilitate use in an electrical circuit adjacent the electrical load.

It is also an object to provide such a protective circuit device which also is capable of sensing very small ground faults producing a leakage of current to ground below the overload current rating of the device.

Another object is to provide such a protective circuit device which may be simply and economically constructed and adjusted to open a circuit in response to dangerous ground fault conditions while avoiding nuisance tripping.

A further object is to provide such a device having a very rapid circuit opening action to insure the protection will be provided quickly enough to prevent electrocution and to minimize the likelihood of fire or explosion, and which is failsafe in design to minimize the impact of component failure.

SUMMARY OF INVENTION

It has now been found that the foregoing and related objects can be readily attained in a protective circuit device for detection and control of leakage from an associated electrical load and excessive current flow from a line power supply to an associated electrical load including a pair of terminals for connection to an external associated alternating current line power supply and a second pair of terminals for connection to an external associated load. There is at least one solid state device connecting one of the first pair of terminals and one of the second pair of terminals and the solid state device has conductive and nonconductive states. Means for changing the prevailing state of the solid state device is provided which includes means generating a pulse trigger signal, which is transmittable to the solid state device to maintain one of such states, and the state of the solid state device changes upon termination of the pulse trigger signal. A current transformer has a core of magnetically susceptible metal, only a single primary winding connected in series between one of the first pair of terminals and one of the second pair of terminals, and a secondary winding which provides an output during operation which is a function of current flow in the primary winding and below a value established by the nominal rating of the protective circuit device. Means is connected to the secondary winding responsive to an output in excess of the value resulting from current drawn by the load in excess of the nominal rating of the protective circuit device and is operative to terminate the pulse trigger signal. As a result, excess current will produce an output in excess of the established value and the responsive means will terminate the pulse trigger signal to change the state of the solid state device to open the circuit controlled thereby.

Preferably, the means connected to the secondary winding operates substantially instantaneously upon occurrence of an output substantially in excess of the nominal rating and, upon occurrence of an output in excess of the nominal rating of lesser magnitude, only after a relatively extended period of time. Most desirably the means connected to the secondary winding includes a resistance and a capacitance connected in parallel relationship and a second adjustable resistance to permit adjustment of the value of the output which will operate the means to terminate the pulse trigger signal. The means for changing the prevailing state of said solid state device includes a selectively conductive silicon controlled rectifier to prevent generation of the pulse trigger signal.

Desirably, the means connected to the secondary winding includes a rectifier and one stage of solid state amplification. A second solid state device preferably is connected between the other of the first pair of terminals and other of the second pair of terminals, with the second solid state device having conductive and nonconductive states dependent upon the means for changing the prevailing state of the first-mentioned solid state device.

The solid state devices may be triacs and the means generating a pulse trigger signal may comprise a unijunction transistor oscillator. The means generating a pulse trigger signal may include a bridge rectifier for rectifying the associated alternating current line power supply. In its most desirable aspect, the protective circuit device will include ground fault detection capabilities. As such, it will incorporate a differential transformer having a core of magnetically susceptible metal, a pair of like primary windings disposed about the core, each of the primary windings being connected in series between one of the first pair of terminals and one of the second pair of terminals. The pair of primary windings under balanced current conditions therein produces a balanced total magnetomotive force so that the net magnetic flux in the core is zero. Under leakage current conditions, the pair of primary windings produce an unbalanced magnetomotive force to create a voltage in the secondary winding of the differential transformer. Means responsive to the voltage in the secondary winding of the differential transformer terminates the pulse trigger signal, whereby the state of the solid state device may be changed to open the circuit controlled thereby.

Most preferably the means responsive to the voltage in the secondary winding for terminating the pulse trigger signal includes a rectifier and a stage of solid state amplification for this voltage.

DETAILED DESCRIPTION OF THE ILLUSTRATED EMBODIMENTS

Figure 1:
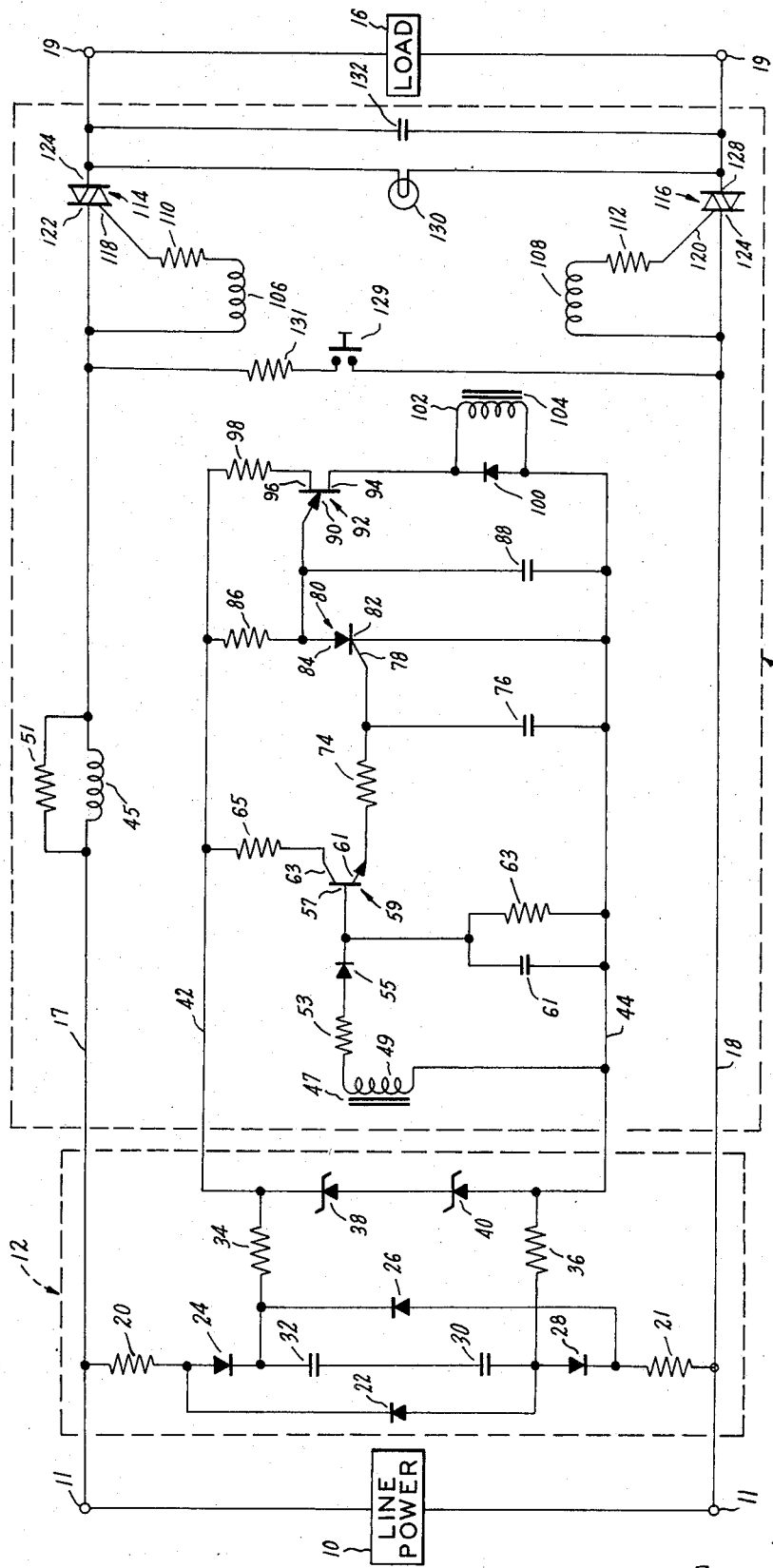
FIG. 1 is a circuit diagram of a protective circuit device embodying the present invention.

Turning now in detail to FIG. 1, of the attached drawing, therein illustrated is a source of alternating current line power 10 and a load 16 connected in series relation to a protective circuit device embodying the present invention. The device 20 has input terminals 11 for the protective circuit power supply 12, and a sensing and isolation circuit generally designated by the numeral 14. Conductors 17, 18 provide a current flow path for line power between input terminals 11 and a pair of output terminals 19 across which the load 16 is connected.

The power supply 12 includes resistors 20, 21 connecting the line power to a bridge rectifier including diodes 22, 24, 26, 28. The resistor 36 is connected to the common junction of diodes 22 and 28, and the resistor 34 is connected to the common junction points of diodes 24 and 26 which are connected to zener diodes 38, 40 to provide voltage regulation of the bridge output. The zener diodes 38, 40 are connected in series to provide voltage regulation which may be precisely established and which is not significantly affected by changes in input voltage or junction temperature. The rectified and regulated voltage output of the power supply 12 is carried by conductors 42, 44 to the sensing and isolation circuit 14.

Interposed in the line conductor 17 is a current transformer primary winding 45, which is wound about a core 47 and cooperates with the current transformer secondary winding 49; as will be appreciated, the output of a secondary winding is a function of the current flow in the primary winding and thus in the line conductor 17. A resistor 51 is connected in parallel with the primary winding 45 for apportioning current in the conductor 17 so as to reduce the requirements for the current transformer primary winding 45, to lower the line losses, to conveniently adjust sensivity and to conveniently lower the current levels for design of the associated trigger circuits. On one side of the secondary winding 49 is connected the conductor 44 and on the opposite side thereof are connected the resistor 53 and the diode 55, which are connected in series with the base 57 of the transistor indicated generally by the numeral 59.

Connected in parallel between the potential of base 57 and the conductor 44 is a network consisting of the capacitor 61 and the resistor 63 which provide a desired time versus current relationship; more specifically, the charging and discharging of the capacitor 61 as affected by current flow through the resistor 63 to the conductor 44 varies the signal applied to base 57. When the critical level signal on base 57 is reached, the transistor 59 will transmit a signal from the emitter 61 thereof to the resistor 74 and thence to the gate 78 of a silicon controlled rectifier (SCR) 80.

The collector 63 of the transistor 59 is connected to the conductor 42 by means of the resistor 65 which limits the current flowing thereto. The resistor 74 controls the current supplied to the gate 78 of the SCR 80 and the capacitor 76 connected between the gate 78 and the conductor 44 eliminates spurious noise spikes. The SCR 80 has a cathode 82 which is connected to the conductor 44 and an anode 84 which is connected in series with the resistor 86 to the conductor 42.

Connected to the anode 84 of SCR 80 are the filter or capacitor 88 and the emitter 90 of the unijunction transistor generally designated by the numeral 92. The unijunction transistor 92 has a first base 94 connected to the pulse transformer primary winding 102, which has connected across it a diode 100 for wave shaping. The second base 96 of the transistor 92 is connected to the conductor 42 through the resistor 98 which controls biasing of the unijunction transistor 92.

The transformer primary winding 102 is disposed about the core 104 and cooperates with the secondary windings 106 and 108 which are in turn connected through the resistors 110, 112 to the gates 118, 120 of the triacs generally designated by the numerals 114, 116. The terminals 122, 124 of the triac 114 are interposed in conductor 17, and a signal operating on the gate 118 will render the material of the triac between the terminals 122, 124 conducting or nonconducting depending upon the arrangement employed. Similarly, the terminals 124, 128 of the triac 116 are interposed in conductor 18 and the material therebetween is rendered conducting or nonconducting by the signal applied to the gate 120. An indicator light 130 is connected across conductors 17, 18 to sense the condition of the triacs 114, 116, i.e., whether they are conducting. The capacitor 132 is positioned in parallel to the indicator light 130 and the load 16 is connected between the terminals 19, 19 of the conductors 17, 18.

Testing is effected by means of the momentary push button switch 129 connected in series with the resistor 131 between conductors 17, 18 to establish a mementary current flow path whereby current flows through current transformer primary winding 45. The resistor 131 limits the maximum current draw during the test operation.

Figure 2:
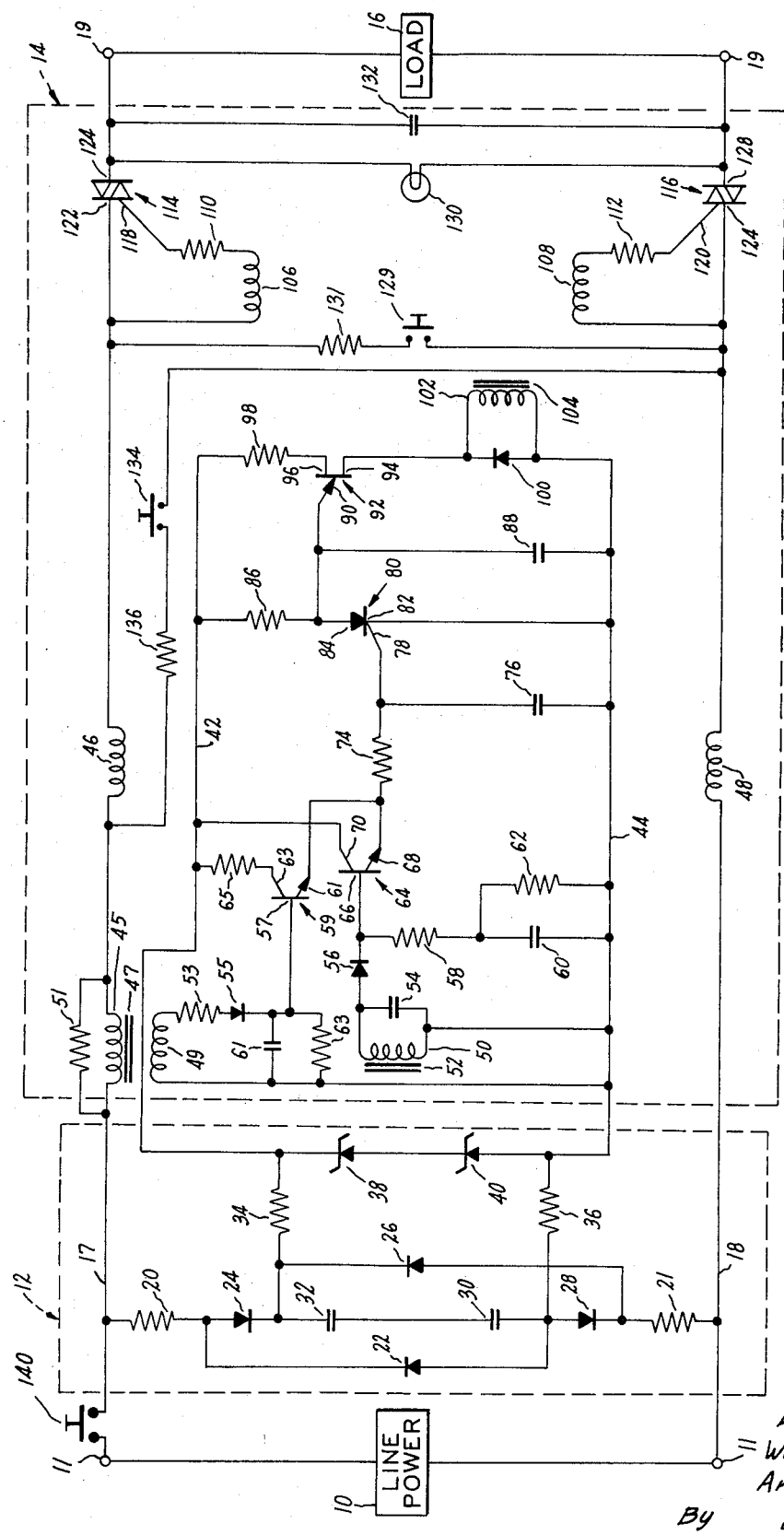
FIG. 2 is a circuit diagram of another embodiment of the invention additionally including ground fault protection.

Turning now in detail to FIG. 2 of the attached drawing, the components of FIG. 1 are included therein although somewhat different in arrangement; the same reference numerals will be employed where appropriate. In this embodiment, other components have been added to provide ground fault protection capabilities in the protective circuit device.

Interposed respectively in the line current conductors 17, 18 are two identical transformer primary windings 46, 48 disposed about a common core 52 of magnetically susceptible metal together with a secondary winding 50, thus forming a differential current sensing transformer. The core 52 is preferably of ferrite construction or tape wound and the primary windings 46, 48 are normally wound about the same portion of core 52 in the same direction with the same number of turns.

Equal current in the line conductors 17, 18 and therefore equal current in the primary windings 46, 48 results in magnetic flux being created in each primary winding which is of the same magnitude and in opposite directions because of the opposite directional current flow in the conductors 17, 18. Accordingly, there is zero magnetic flux because the flux of the two primary windings 46, 48 cancel out, and no electromotive force is induced in the secondary winding 50.

In the event that there is leakage from the load 16, the current flow in the primary windings 46, 48 will not be equal and a net magnetic flux will be produced which will cause a voltage to appear across the secondary winding 50. That voltage is the signal which is then amplified and utilized to trigger the circuitry which isolates the electrical load 16 in response to a ground fault.

The capacitor 54 is connected across the secondary winding 50 and is also connected on one side to the reference level of conductor 44 and on the other side to the diode 56 which rectifies the output of the secondary winding 50. Connected to the other side of the diode 56 in series relation to each other are the resistor 58 and the capacitor 60; the capacitor 60 is an integrator and filter for the output of the differential transformer secondary winding 50 and the resistor 58 limits current flow through the diode 56 into the capacitor 60 during circuit start-up conditions. The resistor 62 is positioned in parallel between the resistor 58 and the conductor 44 for the purpose of providing sensitivity adjustment for the circuit.

Additionally connected to one side of the diode 56 is the base 66 of the transistor 64 which is of the n-p-n type. The collector 70 of the transistor 64 is connected to the conductor 42 and the emitter 68 thereof transmits the amplified current leakage signal to the resistor 74. The connections to the resistor 74 have been described previously with respect to the overcurrent portions of the circuit as regards the embodiment of FIG. 1; thus, the signal is imparted to the silicon controlled rectifier 80.

To provide for test operation of the ground fault circuit the momentary push button switch 134 is connected in series with the resistor 136 between the conductors 17, 18. The momentary closing of the push button 134 allows passage of current through the primary winding 48 but it does not allow passage through the other primary winding 46, thereby simulating a difference in current between line conductors 17 and 18. The resistance value of the resistor 136 is sufficiently large so that there is insufficient current load to cause operation of the overcurrent portions of the circuit. During the test of the overcurrent portions of the circuit with the momentary push button 129 and the resistance 131, equal currents flow in the differential transformer primary windings 46, 48. The level of current flow is sufficient to operate the overcurrent portions of the circuit but the ground fault circuitry is not actuated because the current flow in primary windings 46, 48 is equal. The light 130 is connected to the terminals 124, 128 of triacs 114, 116, and when lighted, indicates that both triacs are in the conductive state. The capacitor 132 is positioned in parallel to the indicator light 130 to maintain normal triac operation in the absence of other loads. To provide for resetting of this embodiment a reset switch 140 is interposed in the conductor 17 between the input terminal 11 and the resistor 20.

OPERATION OF THE DEVICE

Turning first to FIG. 1 and to the operation of the embodiment which provides overcurrent protection only, connection of a source of line power to the input terminals 11, 11 energizes the line conductors 17, 18 and power supply 12.

During one-half of each line power cycle, the current will flow through resistor 20, diode 22, resistor 36, zener diodes 40 and 38, resistor 34, diode 26 and thence to resistor 21 back to the line power source 10. During the other half of each line power cycle, current will flow through resistor 21, diode 28, resistor 36, zener diodes 40 and 38, resistor 34, diode 24, and then to resistor 20 back to the dource of line power 10. The capacitors 30, 32 are connected in series between the junction points of the diodes 22, 28 and the junction point of the diodes 24, 26 to provide a filtering of the bridge output.

The output of current transformer secondary winding 49 is rectified by the diode 55 whereupon the signal is altered by the RC network consisting of the resistor 63 and the diode 61. The current path through resistor 63 significantly reduces the charging rate for the capacitor 61 during periods when the signal from diode 55 is small but, when that signal becomes large in magnitude, the current flow through the resistor 63 is relatively small and capacitor 61 will charge more readily, thereby allowing a signal to pass to the base 57 of the transistor 59.

The signal applied to the base 57 determines the output from the emitter 61 of the transistor 59. That output is adjusted by means of the fixed resistor 74 and filtered by the capacitor 76 before passing to the gate 78 of the SCR 80. The signal applied to the gate 78 determines whether SCR 80 is conductive or nonconductive between the anode 84 and the cathode 82. When SCR 80 is conductive, the capacitor 88 is never charged through the resistor 86 and therefore the unijunction transistor 92 does not function and the triacs 114, 116 will be nonconductive. When no signal is applied to the gate 78 of SCR 80, it will not be conductive between the anode 84 and the cathode 82, and the capacitor 88 may be charged through the resistor 86 until the firing point of the unijunction transistor 92 is reached in a repetitious cyclical pattern to produce a pulse train in the pulse transformer primary winding 102 and thereby the secondary windings 106, 108 which causes triacs 114, 116 to become and stay conductive.

Current flowing in conductor 17 is divided between the resistor 51 and the transformer primary winding 45, which is coupled to the secondary winding 49. The output of the secondary winding 49 passes through the resistor 53 which limits its level before it passes through the diode 55 which rectifies the signal before it reaches the RC network consisting of the capacitor 61 and the resistor 63. The combination thereof provides the desired rapid response to very high current flow relative to a predetermined level or nominal rating for the protective device and a slower response to current only somewhat above the desired level.

The signal is then passed to the base 57 of the transistor 59 to control the signal from the emitter 61 thereof, which, in turn, is limited by the resistor 74 and filtered by the capacitor 76 before passing to the gate 78 of SCR 80. The values of the various components are selected to insure that normal current flow in the line conductor 17 does not trigger conduction of the SCR 80. Upon reaching a predetermined critical level, however, the current flow will cause the gate signal applied to the gate 78 of SCR 80 to reach a sufficient level to make that device conductive.

When the gate signal applied to the gate 78 is not of a level sufficient to make the SCR 80 conductive, but there is an overcurrent of lesser magnitude, the potential between the conductors 42 and 44 will cause the capacitor 88 to charge through the resistor 86 to the firing point level of the unijunction transistor 92. The resistor 86 allows sufficient current flow to charge capacitor 88 when SCR 80 is nonconductive and limits the current drain of the power supply when it is conductive. When the unijunction transistor 92 fires, the capacitor 88 is discharged through the emitter 90 to the base 94 and the pulse transformer primary winding 102. The cyclical repetition of this series of events creates a pulse train which appears not only at the primary winding 102, but also at the secondary windings 106, 108, and thereby at the gates 118, 120 of the triacs 114, 116, causing them to remain in a conductive state. The use of an oscillator in this manner as opposed to a fixed bias results in a minimum power consumption to control the triacs 114, 116.

When the signal applied to gate 78 of SCR 80 reaches the minimum level required to make that device conductive between the anode 84 and cathode 82, the capacitor 88 will no longer charge. Accordingly, the unijunction transistor 92 will not reach its firing level and no pulse train is produced in pulse transformer windings 102, 106, 108. The triacs 114, 116 will not be conductive as a result and output terminals 19 will be isolated from the input terminals 11.

The operation of the circuit protective device shown in FIG. 2 is similar to that of FIG. 1 except that the ground fault detection component circuitry may apply a signal to the gate 78 of SCR 80. More specifically, a difference in current flow between the primary windings 46, 48 produces a voltage across the secondary winding 50 of the differential transformer. This potential is rectified by the diode 56, integrated and filtered by the capacitor 60 and amplified by the transistor 64 before passing to the gate 78 of the SCR 80, thus producing operation of the protective circuit device to open the circuit.

Normal operation of either test switch 134 or 129 will cause SCR 80 to become conductive and cause triacs 114, 116 to go into a nonconductive state. The characteristics of the SCR 80 are such that, upon becoming conductive in response to the gate signal, it will continue to conduct so long as current flow continues between its anode 84 and cathode 82. In normal operation, the only way current flow may be interrupted between these points is by disconnecting the source of line power. In the embodiment of FIG. 1, this will entail disconnecting the conductors 17, 18 from the line power source 10, as for example, by removing a plug for the load providing device from a conventional house receptacle. In the embodiment of FIG. 2, the reset switch 140 in the conductor 17 may be opened temporarily to disconnect the elements of the device from the source 10 of line power to effect resetting. When disconnected from the line power source 10, the SCR 80 of the illustrated embodiments will return to its nonconductive state.

Although the present invention has been illustrated and described with respect to a single phase circuit protection device, it will be readily appreciated that it is also adapted to polyphase circuits. Generally this will entail a separate transformer in each phase to provide the overcurrent protective circuitry in order to ensure adequate sensitivity. In such polyphase circuitry, there should be coaction between components in each of several phases to produce simultaneous opening. Moreover, it is apparent that significantly different arrangements of the components and different components may be used without departing from the spirit of the invention.

By the arrangement of components illustrated, the protective device may be calibrated and set to respond to predetermined levels of overcurrent and ground fault leakage, thus avoiding spurious action while at the same time ensuring essentially instantaneous action. The nominal rating of the protective device will determine the general values for the various components and adjustable components may provide precise calibration of the assembly. The capacitor charging the mechanism will provide operation when the overcurrent is relatively small but sustained, and a high overcurrent will produce instantaneous operation. When employed in conjunction with ground fault protective circuitry, a ground fault leakage will produce operation although it does not produce a current flow in excess of the nominal rating.

Thus, it can be seen from the foregoing detailed specification and drawings that the present invention provides a highly effective circuit protective device which is capable of sensitive response to circuit overcurrent and ground fault irregularities and which is relatively inexpensive to manufacture and operate. By being particularly adapted for use near the point where the electrical power is used (at the load) it avoids nuisance tripping and at the same time quickly and accurately responds to overcurrent and small leakage problems.

It will also be seen that a positive signal is required to render the solid state device conductive and, therefore, the failure of most components will cause the circuit to interrupt power accordingly, the design is of a fail-safe nature. The relative simplicity of the circuitry makes the device reliable and simple to assembly, and the components may be selected to provide relatively long-lived, trouble-free operation.

We claim:

1. A protective circuit device for detection and control of leakage from an associated electrical load and excessive current flow from a line power supply to an associated electrical load, comprising:
   a. a first pair of terminals for connection to an external associated alternating current line power supply;
   b. a second pair of terminals for connection to an external associated load;
   c. at least one solid state device connecting one of said first pair of terminals and one of said second pair of terminals, said solid state device having conductive and nonconductive states;
   d. means for changing the prevailing state of said solid state device including means generating a pulse trigger signal, said pulse trigger signal being transmittable to said solid state device to maintain one of such states, the state of said solid state device changing upon termination of pulse trigger signal;
   e. a current transformer having a core of magnetically susceptible metal, and only a single primary winding connected in a series between one of said first pair of terminals and one of said second pair of terminals, and a secondary winding, said secondary winding providing an output during operation which is a function of current flow in the primary winding and below a value established by the nominal rating of the protective circuit device;
   f. means connected to said secondary winding and responsive to an output in excess of said value resulting from current drawn by the load in excess of the nominal rating of the protective circuit device and operative to terminate said pulse trigger signal whereby excess current will produce an output in excess of said value and said responsive means will terminate the pulse trigger signal to change the state of said solid state device to open the circuit controlled thereby, and said responsive means including a selectively conductive silicon controlled rectifier to prevent generation of said pulse trigger signal which is normally nonconductive and becomes conductive upon a predetermined output in excess of said value to terminate said pulse trigger signal and which latches in said conductive state.

2. The protective circuit device of claim 1 wherein said means connected to said secondary winding operate substantially instantaneously upon occurrence of an output substantially in excess of said nominal rating and, upon occurrence of an output of an excess of lesser magnitude, only after a relatively extended period of time.

3. The protective circuit device of claim 2 wherein said means connected to said secondary winding includes a resistance and a capacitence connected in parallel relationship.

4. The protective circuit device of claim 3 wherein said means connected to said secondary winding includes a second adjustable resistance to permit adjustment of the value of the output which will operate said means to terminate said pulse trigger signal.

5. The protective device of claim 1 wherein said means connected to said secondary winding includes a rectifier.

6. The protective circuit device of claim 5 wherein said means connected to said secondary winding includes one stage of solid state amplification.

7. The protective circuit device of claim 1 wherein a second solid state device is connected between the other of said first pair of terminals and other of said second pair of terminals, said second solid state device having conductive and nonconductive states dependent upon said means for changing the prevailing state of said first-mentioned solid state device.

8. The protective circuit device of claim 7 wherein said solid state devices are triacs.

9. The protective circuit device of claim 8 wherein said means generating a pulse trigger signal comprises a unijunction transistor oscillator.

10. The protective circuit device of claim 9 wherein said means generating a pulse trigger signal includes a bridge rectifier for rectifying the associated alternating current line power supply.

11. The protective circuit device of claim 1 further including:
   g. a differential transformer having a core of magnetically susceptible metal, a pair of like primary windings disposed about said core, and a secondary winding disposed about said core, each of said primary windings being connected in series between one of said first pair of terminals and one of said second pair of terminals, said pair of primary windings under balanced current conditions therein producing a balanced total magnetomotive force so that the net magnetic flux in said core is zero, said pair of primary windings under leakage current conditions producing an unbalanced magnetomotive force to create a voltage in said secondary winding of said differential transformer; and
   h. means responsive to said voltage in said secondary winding of said differential transformer for terminating said pulse trigger signal, whereby the state of said solid state device may be changed to open the circuit controlled thereby.

12. The protective circuit device of claim 11 wherein said means responsive to said voltage in said secondary winding for terminating said pulse trigger signal includes a rectifier.

13. The protective circuit device of claim 12 wherein said means responsive to said voltage in said secondary winding for terminating said pulse trigger signal also includes a stage of solid state amplification for said voltage.

14. The protective circuit device of claim 11 wherein said means responsive to said voltage in said secondary winding of said differential transformer includes said silicon controlled rectifier to which current is supplied to render it conductive and latch it in said conductive state.

* * * * *